United States Patent [19]

Morishita et al.

[11] 4,422,985

[45] Dec. 27, 1983

[54] METHOD AND APPARATUS FOR ENCAPSULATION OF A LIQUID OR MELTABLE SOLID MATERIAL

[75] Inventors: Takashi Morishita, Nishinomiya; Hideki Sunohara, Osaka; Shinsuke Sonoi, Itami, all of Japan

[73] Assignee: Morishita Jintan Co., Ltd., Osaka, Japan

[21] Appl. No.: 423,102

[22] Filed: Sep. 24, 1982

[51] Int. Cl.³ .............................................. A61J 5/04
[52] U.S. Cl. ...................................... 264/4.4; 264/11; 264/13; 264/14; 425/5; 425/6
[58] Field of Search .................. 264/4.4, 11, 13, 14; 425/5, 6

[56] References Cited

U.S. PATENT DOCUMENTS 2,911,672 11/1959 van Erven Dorens et al. ....... 264/4
3,962,383 6/1976 Hagiwara et al. ..................... 264/4
4,251,195 2/1981 Suzuki et al. ........................ 425/6

Primary Examiner—James R. Hall
Attorney, Agent, or Firm—Wegner & Bretschneider

[57] ABSTRACT

A method for encapsulation of a liquid or meltable solid material, comprises the steps of forming a jet of a material to be encapsulated, simultaneously forming a coaxial jet of a capsule-forming material surrounding the jet of the material to be encapsulated, forming a coaxial jet of a heated circulating liquid surrounding the coaxial composite jet of the capsule-forming material and the material to be encapsulated, introducing the resultant coaxial triple jet into a flow of a cooling liquid to form capsules composed of a core of the material to be encapsulated and a capsule or coating film of the capsule-forming material. The heated circulating liquid has a temperature close to or higher than that of the capsule-forming material.

2 Claims, 1 Drawing Figure

METHOD AND APPARATUS FOR ENCAPSULATION OF A LIQUID OR MELTABLE SOLID MATERIAL

BACKGROUND OF THE INVENTION

1. Field of the Invention

The present invention relates to a method and apparatus for encapsulation of a liquid or meltable solid material, more particularly, it relates to a method and apparatus for producing microcapsules filled with a liquid or meltable solid material.

2. Description of the Prior Art

U.S. Pat. No. 4,251,195 discloses an apparatus for producing miniature capsules which comprises a capsule-forming orifice defined by open ends of two coaxial conduits. When producing material-filled capsules with this apparatus, a material to be encapsulated and a capsule-forming material are heated to a temperature not less than a melting point of the capsule-forming material and then fed to the capsule-forming orifice to form a coaxial composite jet. The resultant composite jet is introduced into a flow of a cooling liquid material which flows downwardly in a capsule-forming cylinder arranged just beneath the capsule-forming orifice. The composite jet is formed into material-filled capsules by the interfacial tension of the materials. Although the aforesaid apparatus enables to produce material-filled capsules with a diameter of 0.5 to 5 mm, it is difficult to produce microcapsules filled with a high-melting material and having a diameter of 2 mm or less. Because, smaller the size of the capsule, greater the cooling rate of the material to be encapsulated, resulting in the solidification of the high-melting material before the formation of the microcapsules and blockage of the orifice due to the solidified high-melting material.

SUMMARY OF THE INVENTION

It is therefore an object of the present invention to provide a method and apparatus for encapsulation of a liquid or meltable solid material that makes it possible to produce microcapsules filled with a high-melting material and having a diameter of 2 mm or less as well as microcapsules filled with a liquid or low-melting material and having a diameter more than 2 mm.

According to the present invention there is provided a method for encapsulation of a liquid or meltable solid material, comprising the steps of forming a jet of a material to be encapsulated, simultaneously forming a coaxial jet of a capsule-forming material surrounding the jet of the material to be encapsulated, forming a coaxial jet of a heated circulating liquid surrounding the coaxial composite jet of the capsule-forming material and the material to be encapsulated, introducing the resultant coaxial triple jet into a flow of a cooling liquid to form microcapsules composed of a core of the material to be encapsulated and a capsule or coating film of the capsule-forming material, said heated circulating liquid has a temperature close to or higher than that of the capsule-forming material.

The above method may be carried out by using an apparatus for encapsulation of a liquid or meltable solid material, comprising a jet-forming assembly for making a coaxial composite jet of at least a material to be encapsulated and a capsule-forming material, and a capsule-forming cylinder arranged beneath the tip of the jet-forming assembly, into which a cooled circulating liquid is introduced to form a flow of a cooling liquid, characterized in that said jet-forming assembly comprises an inner nozzle for making a jet of a liquid or meltable solid material to be encapsulated, a middle nozzle coaxially arranged around said inner nozzle for making a coaxial jet of the capsule-forming material surrounding the jet of the material to be encapsulated, and an outer nozzle coaxially arranged around the middle nozzle for making a coaxial jet of a heated circulating liquid surrounding the composite jet of the material to be encapsulated and the capsule-forming material, and that the outer nozzle is connected to means for supplying the heated circulating liquid which is kept at a temperature close to or higher than that of the capsule-forming material.

These and other objects, features of the invention will be further apparent from the following description taken in conjunction with the accompanying drawing which shows, by way of example only, a preferred embodiment of the present invention.

DETAILED EXPLANATION OF THE INVENTION

Figure 1:
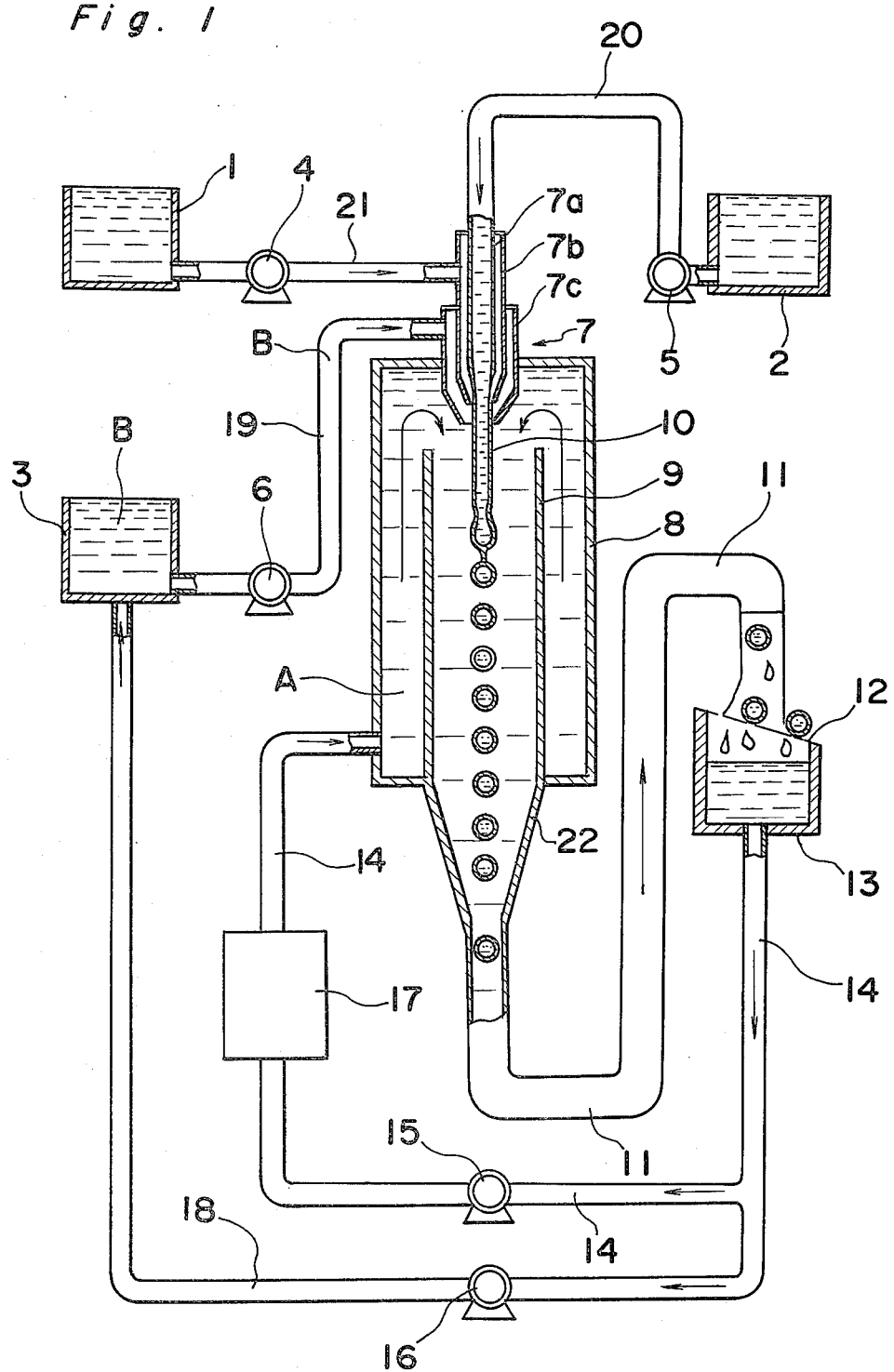
FIG. 1 is a schematic sectional side view of an apparatus for encapsulation of a liquid or meltable solid material according to the present invention.

Referring now to FIG. 1, there is shown an apparatus for encapsulation of a liquid or meltable solid material, which comprises a triple-walled, jet-forming assembly 7, and a capsule-forming cylinder 9 arranged just beneath the jet-forming assembly 7 and on the axis of the assembly 7. The jet-forming assembly 7 comprises an inner nozzle 7a, a middle nozzle 7b and an outer nozzle 7c, which are arranged coaxially to form a triple wall construction. The inner nozzle 7a is connected to a tank 2 for the material to be encapsulated through a pipe 20 provided with a fixed displacement pump 5. The tank 2 is generally provided with a heater (not shown) to liquefy or maintain the material to be encapsulated at a suitable temperature. The middle nozzle 7b is connected to means for supplying the capsule-forming material, which comprises an capsule-forming material tank 1, a pipe 21 and a fixed displacement pump 4 arranged in the pipe 21. The tank 1 is also provided with a heater to liquefy the capsule-forming material. The outer nozzle 7c is also connected to means for supplying the heated circulating liquid, which comprises a circulating liquid tank 3, pipe 19 and a fixed displacement pump 6 arranged in the pipe 19. A number of jet-forming assemblies may be used to produce microcapsules at a high production rate.

The capsule-forming cylinder 9 is fixed at its lower end to the bottom of a cooling cylinder 8 and, its top end is terminated on a level with or at a small distance from the tip end of the jet-forming assembly 7 projected downwardly from the top of the cooling cylinder 8. The lower end of the capsule-forming cylinder 9 is connected to a recovery pipe 11 through a funnel-shaped member 22 mounted on the bottom of the cylinder 8. The recovery pipe 11 extends toward the first circulating liquid tank 13, and terminates at a small distance from the top of the circulating liquid tank 13. Arranged on the circulating liquid tank 13 is a net-like separator 12 for separating microcapsules from the circulating liquid. The tank 13 is connected to the lower portion of the cooling cylinder 8 through a pipe 14 to circulate the circulating liquid. Means for circulating the circulating liquid includes a fixed displacement pump 15 and heat-exchanger 17. A branching pipe 18 of the pipe 14 is connected to the second circulating liquid tank 3 to supply the circulating liquid into the tank 3. The tank 3 may be provided with a temperature regulating means including a heater to heat the circulating liquid to a temperature higher than that of the circulating liquid fed to the cylinder 8 through the pipe 14 and heat exchanger 17. Preferably, the circulating liquid B stored in the tank 3 is heated to a temperature close to or higher than the temperature of the capsule-forming meterial and fed to the outer nozzle 7c.

In use, the material to be encapsulated stored in the tank 2 is heated to a suitable temperature close to or higher than the temperature capsule-forming material, and fed to the inner nozzle 7a of the assembly 7 through the pipe 20 at a constant flow rate to form a downward jet. The capsule-forming material stored in the tank 1 is heated to a suitable temperature higher than its melting point, and fed to the middle nozzle 7b through the pipe 21 at a constant flow rate by the pump 4 to form a jet surrounding the jet of the material to be encapsulated. The circulating liquid stored in the tank 3 is heated to a temperature close to or higher than that of the capsule-forming material, and fed to the outer nozzle 7c at a constant flow rate to form a jet surrounding the composite jet of the capsule-forming material and material to be encapsulated. The jet of the heated circulating liquid B prevents the solidification of the capsule-forming material and/or a high-melting material to be encapsulated at the tip of the jet-forming assembly and contributes to produce microcapsules. The circulating liquid stored in the tank 13 is fed to the cooling cylinder 8 through the pipe 14 and the heat-exchanger 17 by the pump 15. During passing through the heat-exchanger 17, the circulating liquid is cooled to a low enough temperature, for example, about 0° C. The thus cooled, circulating liquid A is passed through the cooling cylinder 8 and fed to the capsule-forming cylinder 9 as a cooling liquid to solidify the capsule-forming material.

The coaxial triple jet 10 gushed from the assembly 7 is forced into the flow of the cooled circulaing liquid in the cylinder 9 and formed into small droplets, which at once assume a spherical form, due to the interfacial tension. During passing through the cylinder 9, the resultant spherical droplets are coolded sufficiently so that the capsule-forming material has been solidified, resulting in the formation of the material-filled capsules. The thus formed material-filled capsules in the circulating liquid are transferred toward the separator 12 through the pipe 11, and then separated from the circulaiting liquid by the separator 12.

The circulating liquid thus separated is recovered to the tank 13. A part of the recovered circulating liquid in the tank 13 is again fed to the cooling cylinder 8 as the cooled, circulating liquid A through the pipe 14 and the heat exchanger 17 by the pump 15. Another part of the circulating liquid is fed to the tank 3 through the pipe 18 by the pump 16 and heated to a temperature close to or higher than that of the capsule-forming material.

EXAMPLES

Using the apparatus shown in FIG. 1, encapsulation of a high-melting material was accomplished in the manner mentioned above. Palm wax (mp. 86° C.) was used as a material to be encapsulated and fed to the nozzle 7a at 95° C. As a capsule-forming material, there was used a solution composed of 20 wt% of gelatin and 80 wt% of purified water, which was fed to the nozzle 7b at a temperature of 95° C. Liquid paraffin was used as the circulating liquids. The liquid paraffin stored in the tank 13 was fed to the cooling cylinder 8 at 0° C. through the heat exchanger 17 as the cooled circulating liquid A, whereas the liquid paraffin stored in the tank 3 was heated to 100° C. and then fed to the nozzle 7c. There was obtained microcapsules filled with palm wax, having a diameter shown in Table 1, without solidification of the palm wax at the tip of the jet-forming assembly. The operating conditions, diameter of each nozzle and capsule-forming cylinder are also shown in Table 1.

TABLE 1

| Example No. | 1 | 2 | 3 | 4 | 5 | 6 | 7 |
|---|---|---|---|---|---|---|---|
| Diameter of capsules (mm) | 1.0 | 2.0 | 3.0 | 4.0 | 5.0 | 6.0 | 7.0 |
| Weight per one capsule (mg) | 0.5 | 4.0 | 14.0 | 33.0 | 65.0 | 110.0 | 180.0 |
| Number of capsules (pieces/min) | 100000 | 12500 | 3600 | 1500 | 770 | 450 | 280 |
| Flow rate of palm wax (g/min) | 40 | 40 | 40 | 40 | 40 | 40 | 40 |
| Flow rate of gelatin solution (g/min) | 50 | 50 | 50 | 50 | 50 | 50 | 50 |
| Second cooling liquid (g/min) | 750 | 190 | 85 | 50 | 30 | 15 | 10 |
| First cooling liquid (g/min) | 50000 | 12500 | 5600 | 3200 | 2000 | 1400 | 1000 |
| Diameter of nozzle 7a (mm) | 2 | 2 | 2 | 2 | 2 | 3 | 3 |
| Diameter of nozzle 7b (mm) | 3 | 3 | 3 | 3 | 3 | 4 | 4 |
| Diameter of nozzle 7c (mm) | 4 | 4 | 4 | 4 | 4 | 5 | 5 |
| Diameter of capsule-forming cylinder (mm) | 22 | 22 | 22 | 22 | 22 | 30 | 30 |

As will be understood from the above, according to the present invention, it is possible to produce microcapsules filled with high-melting materials without blockage of the jet-forming nozzle due to the solidification of the high-melting material even if the particle size of the microcapsules is not more than 2 mm. Also, it is possible to produce microcapsules filled with a liquid or meltable liquid material with a uniform diameter.

What is claimed is:

1. A method for encapsulation of a liquid or meltable solid material, comprising the steps of forming a jet of a material to be encapsulated, simultaneously forming a coaxial jet of a capsule-forming material surrounding the jet of the material to be encapsulated, forming a coaxial jet of a heated circulating liquid surrounding the coaxial composite jet of the capsule-forming material and the material to be encapsulated, introducing the resultant coaxial triple jet into a flow of a cooling liquid to form capsules composed of a core of the material to be encapsulated and a capsule or coating film of the capsule-forming material, said heated circulating liquid has a temperature close to or higher than that of the capsule-forming material.

2. An apparatus for encapsulation of a liquid or meltable solid material, comprising a jet-forming assembly for making a coaxial composite jet of at least a material to be encapsulated and a capsule-forming material, and a capsule-forming cylinder arranged beneath the tip of the jet-forming assembly, into which a cooled circulating liquid is introduced to form a flow of a cooling liquid, characterized in that said jet-forming assembly comprises an inner nozzle for making a jet of a liquid or meltable solid material to be encapsulated, a middle nozzle coaxially arranged around said inner nozzle for making a coaxial jet of the capsule-forming material surrounding the jet of the material to be encapsulated, and an outer nozzle coaxially arranged around the middle nozzle for making a coaxial jet of a heated circulating liquid surrounding the composite jet of the material to be encapsulate and the capsule-forming material, and that the outer nozzle is connected to means for supplying a cooling liquid as the heated circulating liquid which is kept at a temperature close to or higher than that of the capsule-forming material.

* * * * *